United States Patent [19]

Kanzaki

[11] Patent Number: 4,752,203

[45] Date of Patent: Jun. 21, 1988

[54] CASTING FRAME STRUCTURE OF CENTRIFUGAL CASTING MACHINE

[75] Inventor: Ichiro Kanzaki, 14-12 Shimoitohzu 4-chome, Kokurakita-ku, Kitakyushu-shi, Japan

[73] Assignees: Ichiro Kanzaki, Kitakyushu; Mitsuharu Ogura, Takamatsu, both of Japan

[21] Appl. No.: 944,389

[22] Filed: Dec. 19, 1986

[30] Foreign Application Priority Data

Dec. 23, 1985 [JP] Japan ................................ 60-291545

[51] Int. Cl.[4] .......................... B29C 5/10; B29C 7/26; B29C 7/08

[52] U.S. Cl. .................................... 425/182; 425/434; 425/435

[58] Field of Search ............... 425/182, 183, 214, 434, 425/435

[56] References Cited

U.S. PATENT DOCUMENTS 1,073,584 9/1913 Annis .................................. 425/434

1,626,447 4/1927 Bramin ................................ 425/214

1,828,914 10/1931 Waggoner ........................... 425/425

*Primary Examiner*—Willard E. Hoag

*Attorney, Agent, or Firm*—Jordan and Hamburg

[57] ABSTRACT

A casting frame structure of a centrifugal casting machine. Comprising (a) a hollow rotary drum defining a concrete-slurry charging space therein and being integrally provided with a bottom plate on the rear end thereof, the rotary drum replaceably connected with a rotary plate driven by replaceably mounting the back plate to the rotary plate, the rotary drum having a feeder opening at the front end thereof through which a concrete slurry is supplied into the concrete-slurry charging space of the rotary drum, (b) a plurality of casting frames replaceably mounted on and along an inner wall of the rotary drum, (c) a plurality of casting frame positioning-and-fixing members arranged between the inner surface of said back plate of the rotary drum and axially outer surfaces of the casting frames for replaceably positioning and fixing the casting frames in place on the inner surface of the rotary drum. Due to such construction, the casting frame structure can be firmly mounted on the centrifugal casting machine and the casting frames can be readily and firmly mounted on the inner surface of the rotary drum.

2 Claims, 7 Drawing Sheets

CASTING FRAME STRUCTURE OF CENTRIFUGAL CASTING MACHINE

TECHNICAL FIELD

The present invention relates to an improvement of a casting frame structure of a centrifugal casting machine.

BACKGROUND ART

Conventionally, as one of methods for producing concrete products, a centrifugal casting method is known and the machine used for the method comprises a rotary assembled body which is constructed by assembling a plurality of casting frames as an integral unit and such rotary assembled body is rotated at a high speed by a rotating mechanism.

The other type of the machine comprises a rotary drum which is rotated at a high speed by a rotating mechanism and a multiplicity of casting frames are mounted on the inner surface of the rotary drum.

For producing the concrete products, concrete slurry is charged into the rotary assembled body or the rotary drum by way of a feeder chute or a screw feeder which has the front end thereof disposed within the rotary assembled body or the rotary drum while the rotary assembled body or the rotary drum is being rotated at a high speed.

Due to the above rotation of the rotary assembled body or the rotary drum, a centrifugal force is exerted on the charged cement slurry and the cement slurry is filled in a plurality of concrete-slurry casting spaces defined by the casting frames.

After the above casting operation, the cement slurry filled in the concrete-slurry casting space is hardened and cured for a desired period and concrete products are removed from the concrete-slurry casting spaces.

With the above former type of the centrifugal casting machine, however, in each casting operation, the casting frames must be assembled one to the other and such assembling operation is considerably cumbersome and time-consuming.

Furthermore, since the rotary assembled body must withstand an extremely large centrifugal force during the casting operation, the structure of the rotary assembled body becomes complicated and heavy and consumes a considerable amount of energy or power for the rotation thereof. Still furthermore, since the rotary assembled body is mounted on the rotating machine by a plurality of mounting arms, the size of the rotary assembled body is restricted.

With the latter type of the centrifugal casting machines, the casting frames must be mounted on the inner surface of the rotary drum before the casting operation and the casting frames must be dismounted from the inner surface of the rotary drum to remove the concrete products from the rotary drum after the casting operation. Whereas, since the casting frames are mounted on the inner surface of the rotary drum without any positioning and fixing guide means, the mounting of such casting frames is, in general, very cumbersome and time-consuming. The same goes to the dismounting of the casting frames from the inner wall of the rotary drum.

Furthermore, during the casting operation, the concrete slurry is filled in the casting spaces with a considerable centrifugal force so that the concrete products, after being hardened, firmly adhere to the inner surfaces of the outer frames or outer surfaces of the cores. Accordingly, during the dismounting of the outer frames or the cores to take out the concrete products from the rotary drum, the removal of the concrete products becomes extremely difficult when the concrete products are considerably heavy ones.

Accordingly, it is an object of the present invention to provide a casting frame structure of a centrifugal casting machine which can resolve the above defects of conventional casting frame structures so as to enable the prompt or ready mounting and removal of the casting frames on or from the inner wall of the rotary drum thus enabling the mass-production of the concrete products.

It is another object of the present invention to provide a casting frame structure of a centrifugal casting machine which can produce the concrete products of high quality and high precision which are completely free from ruptures or cracks.

DISCLOSURE OF INVENTION

In summary, the present invention discloses a casting frame structure of a centrifugal casting machine which comprises (a) a hollow rotary drum defining a concrete-slurry charging space therein and being integrally provided with a bottom plate on the rear end thereof, the rotary drum replaceably connected with a rotary plate driven by replaceably mounting the bottom plate to the rotary plate, the rotary drum having a feeder opening through which a concrete slurry is supplied into the concrete-slurry charging space of the rotary drum, (b) a plurality of casting frames arranged along an inner wall of the rotary drum, (c) a plurality of casting frame positioning-and-fixing members arranged between the inner surface of said bottom plate of the rotary drum and axially outer surfaces of the casting frames for replaceably positioning and fixing the casting frames in place on the inner surface of the rotary drum.

BRIEF EXPLANATION OF THE DRAWINGS

FIG. 3(*b*) is an enlarged cross-section of the encircled protrusion and groove structure FIG. 3(*a*).

BEST MODE FOR CARRYING OUT THE INVENTION

Figure 1:
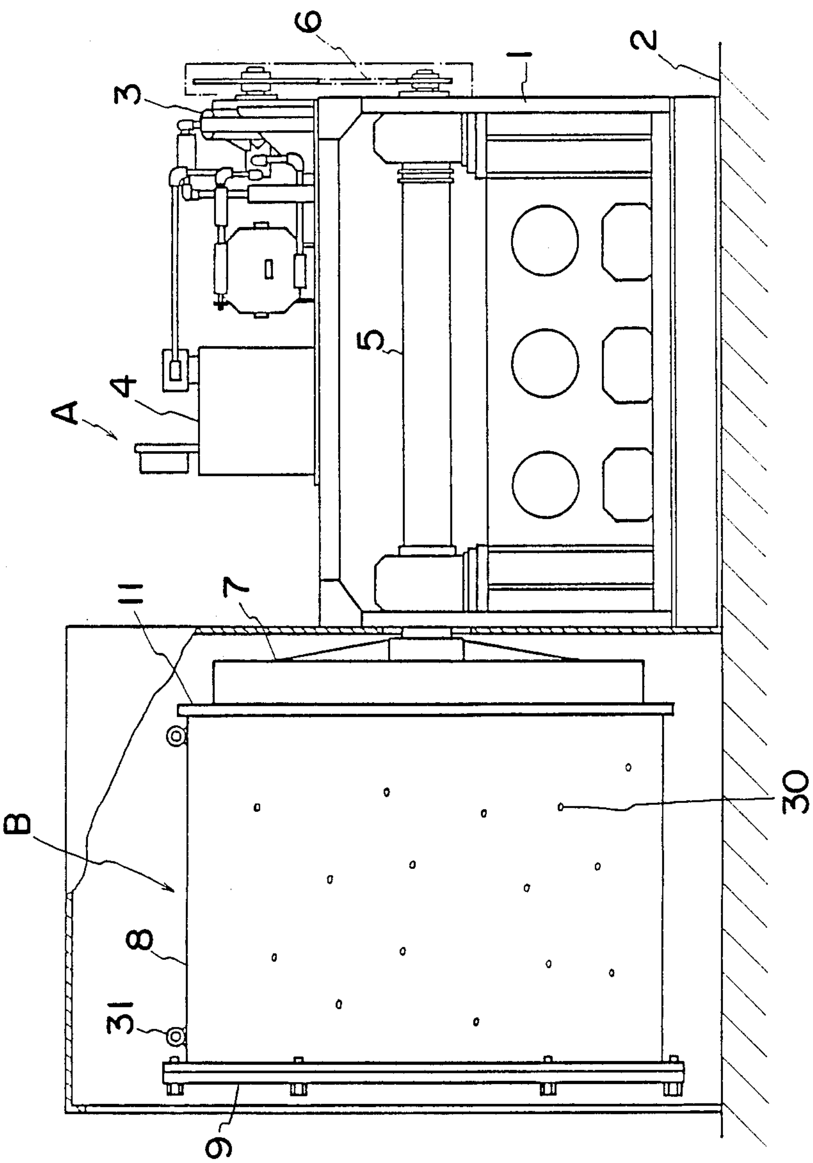
FIG. 1 is an elevational view of the centrifugal casting machine which is provided with the casting frame structure of the present invention.

The present invention is disclosed in view of a following embodiment.

In FIG. 1 to FIG. 5, A indicates a centrifugal casting machine which is constructed as follows.

A support frame 1 is installed on a floor 2 and a hydraulic motor 3 which is hydraulically connected with an oil storage tank 4 is mounted on the upper face of the support frame 1.

A main rotary shaft 5 is rotatably disposed within the support frame 1 and such rotary shaft 5 has one end operably connected with an output shaft of the hydraulic motor 3 by means of a power-transmitting mechanism 6 such as an endless chain and the other end thereof extended from the one side of the support frame 1.

A circular rotary plate 7 is fixedly secured to the extended end of the rotary shaft 5 by a suitable holding mechanism.

On such circular rotary plate 7, a casting frame structure B is replaceably but firmly mounted and such casting frame structure B comprises a circular cylindrical rotary drum 8, a front-end plate 9 replaceably mounted on the front end of the rotary drum 8, and a multiplicity of casting frames 12 which are mounted on the inner surface of the rotary drum 8.

Figure 2:
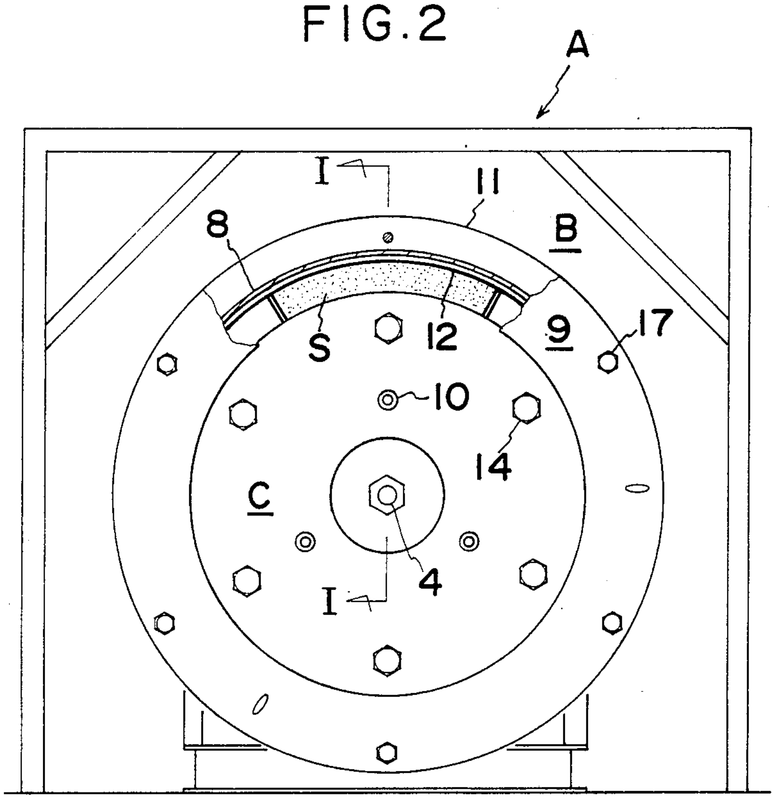
FIG. 2 is a front side view with a part broken away of the centrifugal casting machine.

In the above construction, as shown in FIG. 1 and FIG. 2, the rotary drum 8 is integrally provided with a circular bottom plate 11 on the rear end thereof and the holding mechanism comprises a plurality of drum-positioning pins 10 which are mounted on the circular rotary plate 7 to be replaceably inserted into a plurality of apertures 13 formed on the bottom plate 11 of the rotary drum 8 and a plurality of fastening bolts 14 which fixedly secure the bottom plate 11 to the circular rotary plate 7.

Figure 3A:
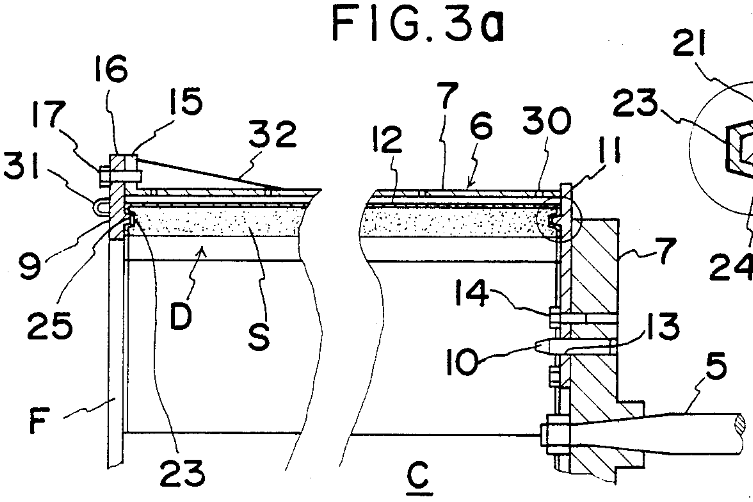
FIG. 3(*a*) is an cross-sectional view of the centrifugal casting frame structure taken along the line I—I of FIG. 2.
Figure 3B:
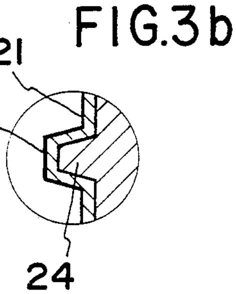

As shown in FIG. 3, the rotary drum 8 has an annular circular flange 15 integrally secured to the front end thereof and the outer peripheral part 16 of the annular front-end plate 9 is replaceably but firmly secured to the flange 15 by a plurality of fastening bolts 17 to firmly set a plurality of casting frames 12 on the inner surface of the rotary drum 8 as described later.

The construction of the casting frames 12 which are accomodated in the rotary drum 8 are explained in detail hereinafter in conjunction with FIG. 3 to FIG. 5.

As shown in FIG. 3, the casting frames 12 are constructed such that they are applicable as segments S for tunnel construction by a shield tunneling method in which each casting frames 12 per se constitutes an outer shell of the segment S.

Figure 4:
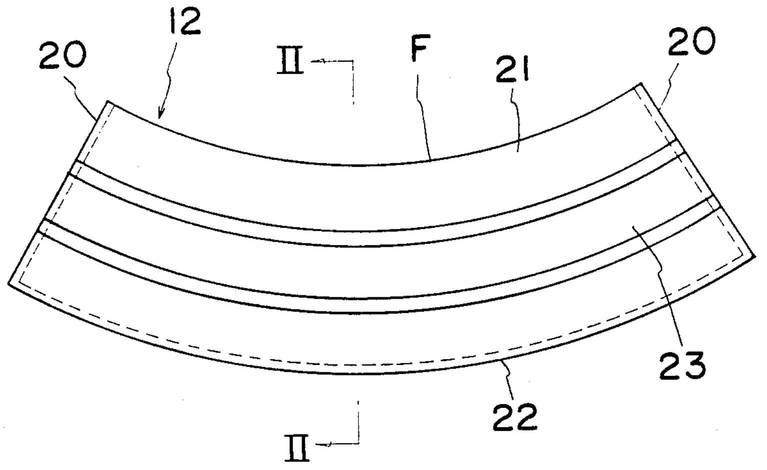
FIG. 4 is an enlarged end view of the casting frame mounted on the inner surface of the rotary drum of the casting frame structure.
Figure 5:
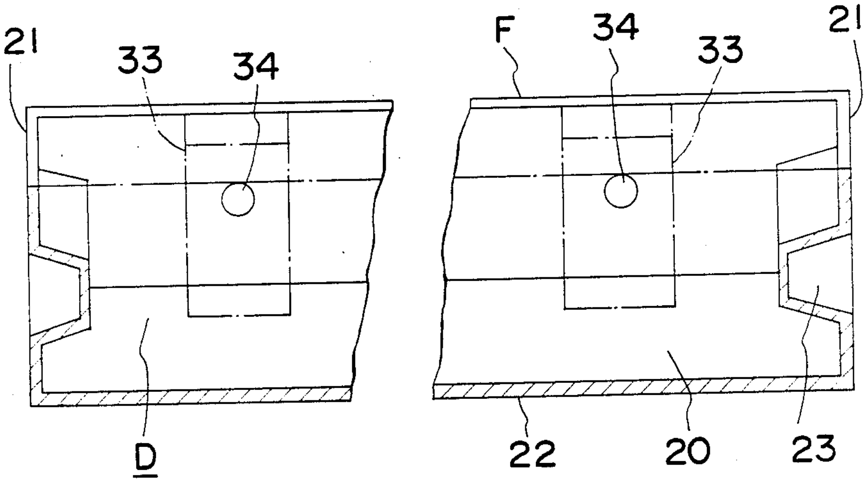
FIG. 5 is a cross-sectional view of the above casting frame taken along the line II—II of FIG. 4.

As shown in FIG. 4 and FIG. 5, the casting frame 12 has an open-ended body-like construction and is constructed by integrally connecting a pair of rectangular side plates 20 and a pair of arcuate rectangular end plates 21 to the side edges and end edges of the arcuate flat rectangular circular bottom plate 22.

The casting frames 12 are arranged on the inner surface of the rotary drum 8 in such a manner that the openings of the casting frames 12 are directed toward the inside of the rotary drum 8.

On the outer surfaces of the arcuate end plates 21, arcuate grooves 23 are formed and such grooves 23 have a trapezoid cross-section. When the casting frames 12 are mounted on the inner surface of the rotary drum 8 in place, such grooves 23 are all communicated with each other to form a circular annular groove.

On the inner surface of the bottom plate (or back plate) 11 of the rotary drum 8, as shown in FIG. 2, a circular annular protrusion 24 having a trapezoid cross-section is formed, while on the inner surface of the front end plate 9, a circular annular protrusion 25 having a trapezoid cross-section is formed.

Such protrusions 24 and 25 replaceably fit into the annular circular grooves formed by the above-mentioned arcuate grooves 23 so that the casting frames 12 can have the both ends thereof supported by the bottom plate 11 of the rotary drum 8 and the front-end plate 9 respectively.

For fixedly securing the casting frames 12 on the inner surface of the rotary drum 8, the front-end plate 9 is fixedly secured to the front end of the rotary drum 8 by fastening bolts 17. F indicates a feeding opening for concrete slurry.

Referring to other constructional feature of this embodiment, as can be readily understood from FIG. 1, the rotary drum 8 is also provided with a plurality of apertures 30 for drainage of concrete slurry which is overflown from a concrete casting space D defined in the casting frames 12.

In FIG. 1, numeral 31 indicates a suspending bolt attached to the outer periphery of the front-end plate 9 for suspending the casting frame structure B, numaral 32 indicates a plurality of reinforcing brackets which are mounted on the outer surfaces of the rotary drum 8, and numeral 33 in FIG. 5 indicates block-shaped stuffings made of foamed urethane replaceably mounted on the inner surface of the side plates 20 used for assuring spaces necessary for connecting the casting frames 12 in a circumferential direction by means of a bolt which passes through apertures 34 formed on the side plates 20 of the casting frames 12.

The manner in which the segments S used for a tunnel construction are produced by the centrifugal casting machine A provided with the casting frame structure B of this embodiment is hereinafter disclosed.

The casting frame structure B is driven or rotated by the hydraulic motor 3 at a high speed and the concrete slurry is charged into the concrete charging space C defined in the rotary drum 8 by way of a conventional concrete feeding machine by, for example, inserting the front end of a screw feeder of the machine into the concrete charging space C, while the casting-frame structure B is being driven.

Due to the above rotation of the rotary drum 8, a centrifugal force is exerted on the charged concrete slurry and the concrete slurry is filled in concrete-casting spaces D defined between the casting frames 12.

After the above casting operation, the concrete slurry filled in the concrete-casting spaces D is hardened and cured for a desired period until the concrete slurry becomes sufficiently hardened to withstand the removal thereof from the rotary drum 8 together with the casting frames 12.

Finally the segments S which are provided with the casting frames 12 as outer shells thereof are removed from the rotary drum 8 by loosening fastening bolts 14, 17 and 34.

In the above embodiment, although the casting frames 12 are constructed such that the concrete products E can have the rectangular cross section as shown in FIG. 3, the casting frames 12 can be constructed in other shapes so as to produce the segments S or the concrete products E of various shapes.

In FIG. 6 to FIG. 13, some modifications of the casting frames 12 are shown.

Figure 6:
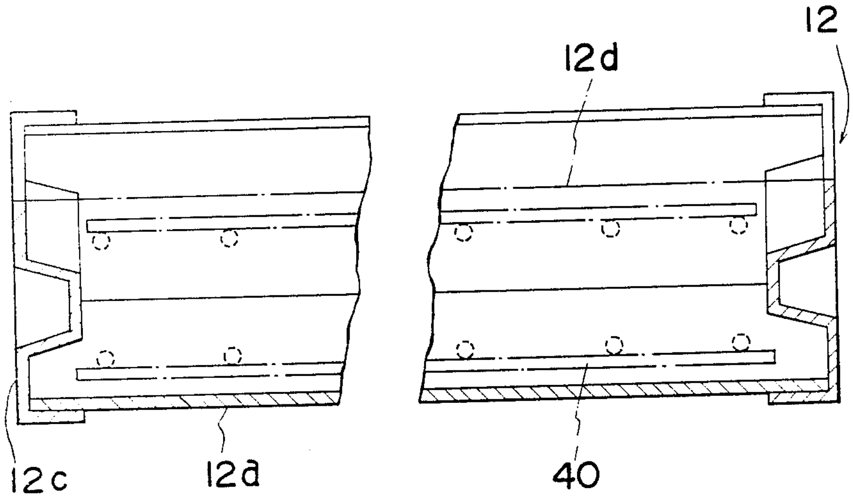
FIG. 6 is a cross-sectional view of a modification of the casting frame.

In FIG. 6, the casting frame 12 is provided with steel bars 40 for reinforcing the segment S and the casting frame 12 consists of a separable bottom plate 12*a* and a separable plate-like ring 12*b* made of a pair of end plates 12*c* and side plates 12*d*.

Figure 7:
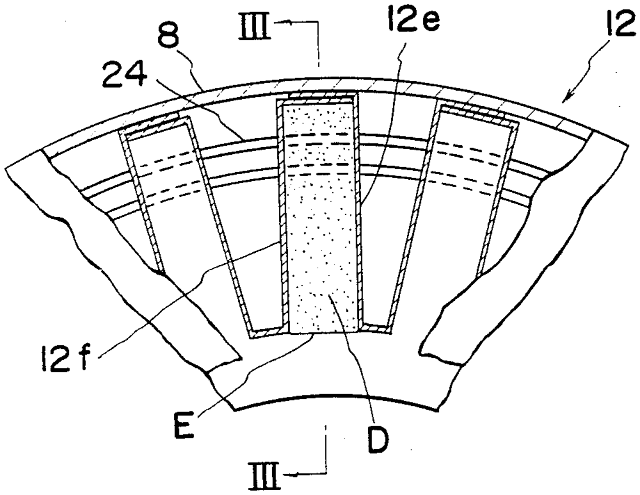
FIG. 7 is an explanatory view of another modification of the casting frame.
Figure 8:
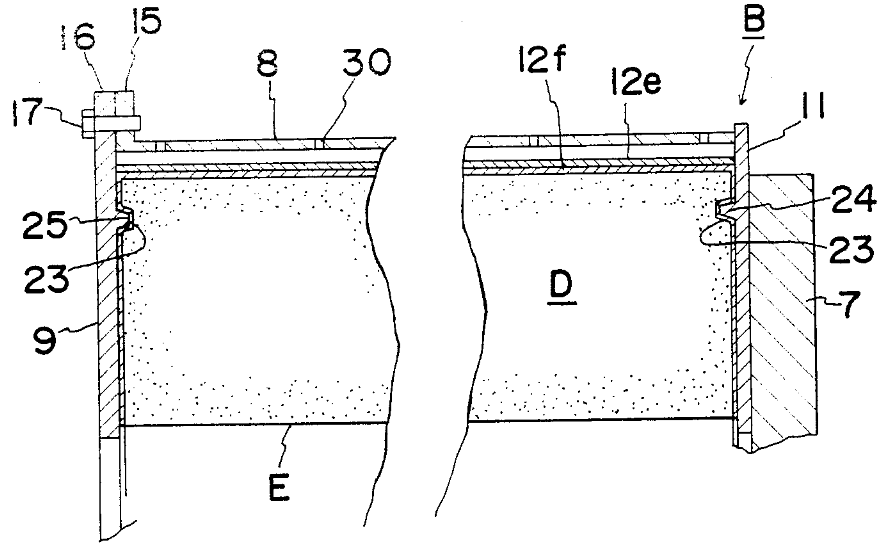
FIG. 8 is a cross-sectional view of the casting frame taken along the line III—III of FIG. 7.

In FIG. 7 and FIG. 8, the casting frames 12 have shapes suitable for the production of the concrete products E of the solid flat rectangular cross-section.

The casting frame 12 is substantially made of a pair of L-shaped outer frame 12*e* and 12*f* which have the radially-outer end plates thereof overlapped each other to define the concrete-slurry casting space D.

Figure 9:
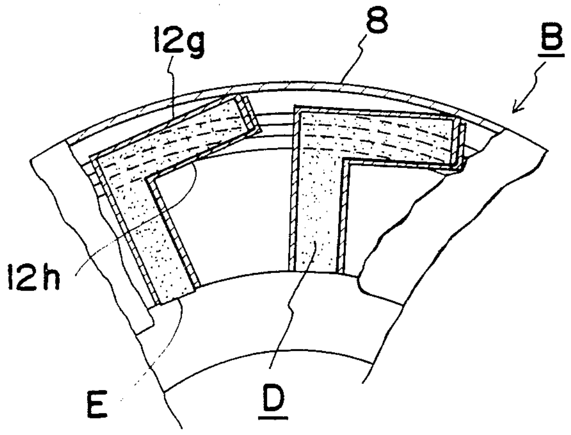
FIG. 9 to FIG. 11 are explanatory views of several other modifications of the casting frames available to the casting frame structure of the present invention.

In FIG. 9, the casiting frames 12 have shapes suitable for the production of the concrete products E of the solid L-shaped cross-section.

The casting frame 12 is substantially made of a pair of L-shaped outer framed 12*g* and 12*h* which have the radially-outer end plates thereof overlapped each other to define the concrete-slurry casting space D.

Figure 10:
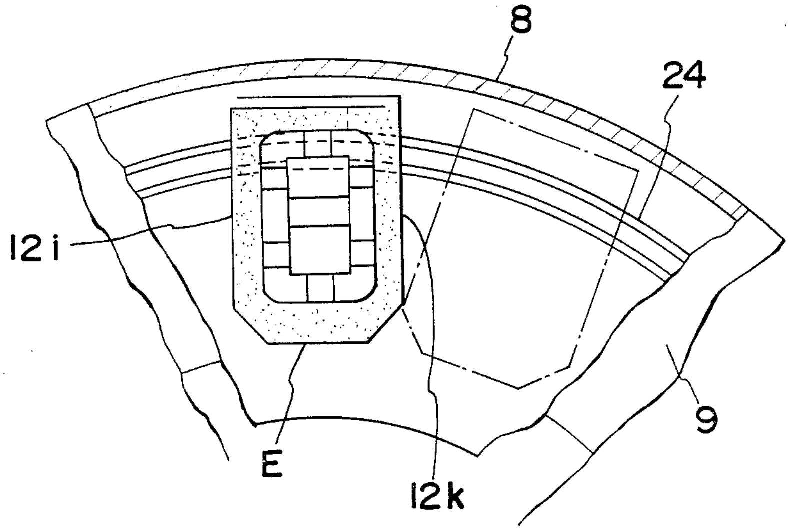
Figure 11:
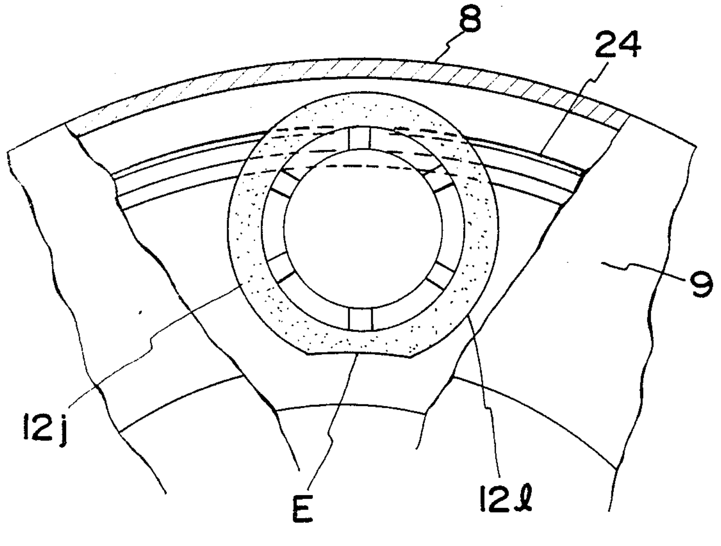
Figure 12:
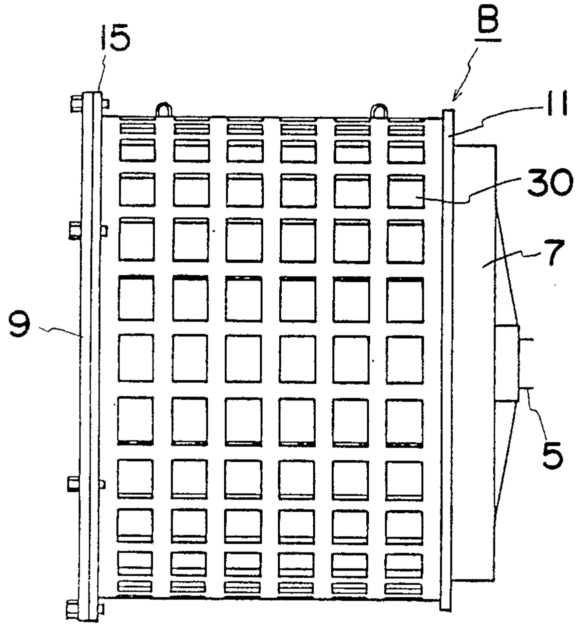
FIG. 12 is an explanatory view of a modification of the casting frame structure of the present invention.

In FIG. 10 and FIG. 11, the casting frames 12 have shapes suitable for the production of the concrete products E of the hollow rectangular cross section and of the hollow circular cross section.

For producing such concrete products E, the casting frame 12 is made of an outer frame 12*i*, 12*j* and a core 12*k*, 12*l* encased by the outer frame 12*i*, 12*j*.

Figure 13:
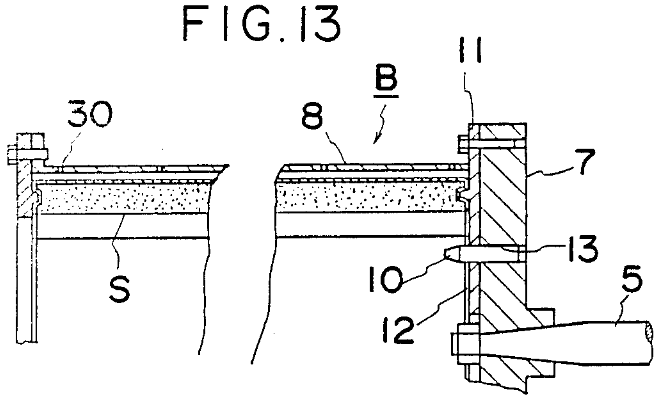
FIG. 13 is an enlarged cross-sectional view of the casting frame structure of FIG. 12.

In FIG. 13, a modification of the above embodiment is shown, wherein the rotary drum 8 of the casting frame structure B has a multiplicity of square shaped apertures 17 for the drainage of overflown concrete slurry as well as for redusing the weight thereof.

In the above embodiment, the concrete slurry may be an ordinary slurry which is a mixture of portland cement, gravel, sand and water. The concrete slurry can be in other forms such as the one which incudes reinforcing materials such as synthetic resin fibers such as polyvinylidene chloride fibers, carbon fibers, glass fibers, steel bars or ornamented gravels for producing artificial plates. The concrete slurry may include coloring agent to produce colored boards or plates.

Furthermore, the concrete products E may include a light-weighted material such as a foamed urethane to produce the concrete products of an improved acoustic insulation and an improved heat insulation.

The casting frames 12 may be provided with designed patterns on the inner and outer surfaces thereof respectively so that the concrete products E produced with such casting frame 12 can have the designed patterns on the surface thereof.

Still furthermore, the casting frames 12 may be provided with peelable rubber coating films and such films are removed together with concrete products E.

What is claimed is:

1. A casting frame structure for a centrifugal casting machine having a rotary plate, comprising:

(a) a hollow rotary drum defining a concrete-slurry charging space therein and being integrally provided with a back plate on the rear end thereof, said rotary drum being replaceably connected to the rotary plate of said centrifugal casting machine by means for replaceably mounting said back plate to said rotary plate, said rotary drum having a feeder opening at the front end thereof through with a concrete slurry is supplied into said concrete-slurry charging space of said rotary drum, (b) a plurality of casting frames replaceably mounted on and along the inner wall of said rotary drum, and (c) a plurality of casting frame positioning-and-holding members arranged at least between the inner surface of said back plate of said rotary drum and axially outer surfaces of said casting frames for replaceably positioning and holding said casting frames in place on the inner surface of said rotary drum, said plurality of casting frame positioning-and-holding frame members comprising an annular circular protrusion formed on the inner surface of said back plate and a plurality of arcuate grooves formed on said axially outer end surface of said casting frames, said arcuate grooves being connected to form a circular annular groove which receives said annular circular protrusion.

2. A casting frame structure for a centrifugal casting machine having a rotary plate, comprising:

(a) a hollow rotary drum defining a concrete-slurry charging space therein and being integrally provided with a back plate on the rear end thereof, said rotary drum being replaceably connected with the rotary plate of said centrifugal casting machine by means for replaceably mounting said back plate to said rotary plate, said rotary drum having a feeder opening at the front end thereof through which a concrete slurry is supplied into said concrete-slurry charging space of said rotary drum, (b) a plurality of casting frames replaceably mounted on and along the inner wall of said rotary drum, and (c) a plurality of casting frame positioning-and-holding members arranged at least between the inner surface of said back plate of said rotary drum and axially outer surfaces of said casting frames for replaceably positioning and holding said casting frames in place on the inner surface of said rotary drum, said plurality of casting frame positioning-and-holding members comprising an annular circular groove formed on the inner surface of said back plate and a plurality of arcuate protrusions formed on said axially outer end surface of said casting frames, said arcuate protrusions being connected to form a circular annular protrusion which is received in said annular circular groove.

* * * * *